(12) United States Patent
Murata et al.

(10) Patent No.: US 8,285,264 B2
(45) Date of Patent: Oct. 9, 2012

(54) MOBILE COMMUNICATION TERMINAL AND FUNCTION LIMITATION CONTROL

(75) Inventors: Masanobu Murata, Tokyo (JP); Ryoko Goseki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/034,912

(22) Filed: Feb. 25, 2011

(65) Prior Publication Data

US 2011/0244837 A1 Oct. 6, 2011

(30) Foreign Application Priority Data

Mar. 31, 2010 (JP) .................................. 2010-081107

(51) Int. Cl.
*H04M 3/42* (2006.01)

(52) U.S. Cl. ...................... 455/414.1; 455/418; 455/419; 455/404.2

(58) Field of Classification Search ............... 455/414.1, 455/418, 419, 404.2

See application file for complete search history.

(56) References Cited

U.S. PATENT DOCUMENTS

| | | | |
|---|---|---|---|
| 7,970,388 B2 * | 6/2011 | Pfeffer et al. | 455/414.1 |
| 2005/0096009 A1 * | 5/2005 | Ackley | 455/405 |
| 2006/0293057 A1 * | 12/2006 | Mazerski et al. | 455/445 |
| 2009/0089565 A1 * | 4/2009 | Buchanan et al. | 713/1 |
| 2010/0151849 A1 * | 6/2010 | Weinzierl | 455/419 |

FOREIGN PATENT DOCUMENTS

| | | |
|---|---|---|
| JP | 2006050097 A | 2/2006 |
| JP | 2007509512 A | 4/2007 |
| JP | 2007194689 A | 8/2007 |

* cited by examiner

*Primary Examiner* — Kwasi Karikari

(57) ABSTRACT

A predetermined communication terminal limits an available function of a mobile communication terminal. The mobile communication terminal sets on a limitation on the use of a specified function of its own terminal in accordance with function limitation setting information determined between the predetermined communication terminal and a server. When the specified function is tried to be used, the mobile communication terminal acquires current location information on the predetermined communication terminal and determines whether to enable or disable the specified function depending on the relationship of location with the predetermined communication terminal.

12 Claims, 12 Drawing Sheets

CHILD'S MOBILE CONTROL

DESIGNATE AREA
● SCHOOL
○ FROM MAP
○ FROM ADDRESS BOOK

[ NEXT ]

(H)

CHILD'S MOBILE CONTROL

SETTING ON MOBILE TELEPHONE (09011112222) IS IN PROGRESS.

PLEASE WAIT

[ NEXT ]

(I)

CHILD'S MOBILE CONTROL

SETTING IS COMPLETED

FIG.11
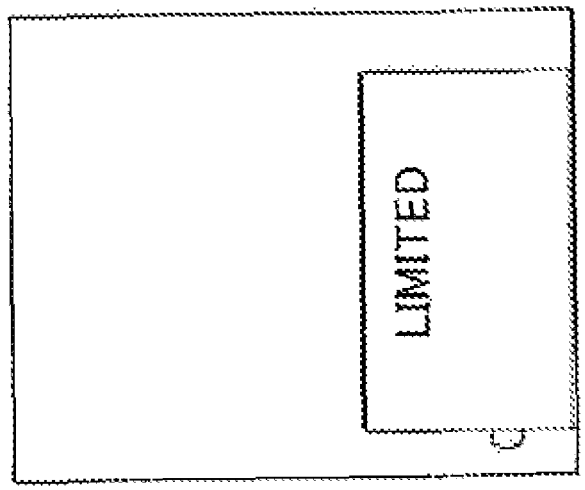
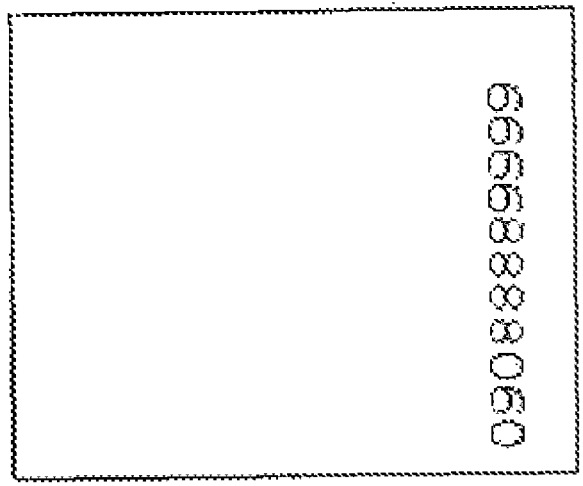

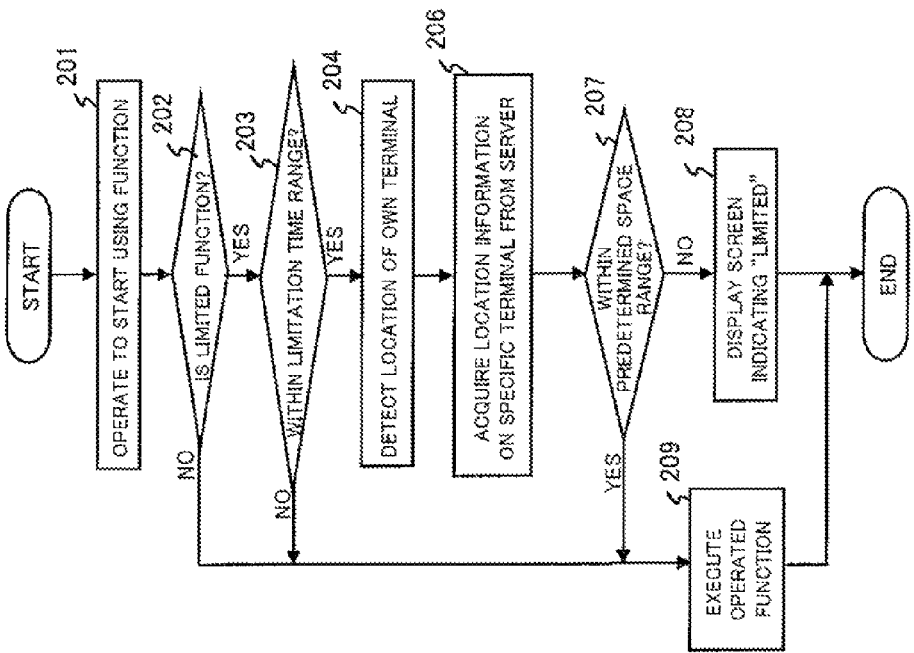

MOBILE COMMUNICATION TERMINAL AND FUNCTION LIMITATION CONTROL

This application is based upon and claims the benefit of priority from Japanese Patent Application No. 2010-081107, filed on Mar. 31, 2010, the disclosure of which is incorporated herein in its entirety by reference.

BACKGROUND OF THE INVENTION

1. Field of the Invention

The present invention relates to a mobile communications system for a mobile telephone terminal and the like and, more particularly, to a function limitation control method for a mobile communication terminal on which a function limitation is placed from outside, as well as to a mobile communication terminal using the method.

2. Description of the Related Art

There has been proposed various kinds of systems or software for setting parental controls, which allow parents to monitor their children's usage of mobile telephone terminals and/or information communication devices and to place function limitations thereon.

For example, Japanese Patent Application Unexamined Publication No. 2007-509512 discloses a method of remotely controlling a particular use of a wireless device disclosed in which a parent can limit a particular use of his/her child's mobile telephone terminal based on time and day through his/her own mobile telephone terminal or personal computer. Moreover, Japanese Patent Application Unexamined Publication No. 2006-050097 discloses a system which is capable of placing or releasing a limitation on available functions through a control server depending on the movement of a mobile information terminal. Furthermore, Japanese Patent Application Unexamined Publication No. 2007-194689 discloses a system in which a child's mobile telephone terminal is registered with a child management terminal beforehand, and monitoring of the child's mobile telephone terminal is performed through the child management terminal.

However, in the systems described above, no consideration is given to what environment and what condition the controlled party is in. Therefore, uniform or fixed function limitations are placed regardless of the environment, and it is impossible to limit usage depending on the real surroundings. Accordingly, in the case where a child is allowed to carry a mobile telephone terminal provided with parental control functionality, the flexibility in use of a mobile telephone terminal is greatly impaired.

SUMMARY OF THE INVENTION

Accordingly, an object of the present invention is to provide a mobile communications system, a mobile communication device, and a function limitation control method that make it possible to place an effective function limitation without impairing the flexibility in use of a mobile communication device.

According to the present invention, a mobile communication device having a plurality of functions, includes: a function limitation setting section for setting a limitation on a specified function according to function limitation setting information which is determined by a predetermined communication device through a server; and a control section for determining whether to enable the specified function depending on a relationship of location with the predetermined communication device when the function limitation setting section places a limitation on the specified function.

According to the present invention, a method for controlling function limitation in a mobile communication device having a plurality of functions, includes the steps of: setting a limitation on a specified function according to function limitation setting information which is determined by a predetermined communication device through a server; and when a limitation is placed on the specified function, determining whether to enable the specified function depending on a relationship of location with the predetermined communication device.

According to the present invention, a mobile communications system includes: a mobile communication device having a plurality of functions; a predetermined communication device which is capable of parental control of the mobile communication device; and a server which provides a parental control service to the mobile communication device and the predetermined communication device, wherein the predetermined communication device determines function limitation setting information through the server to set a limitation on a specified function of the mobile communication device, wherein the mobile communication device determines whether to enable the specified function depending on a relationship of location with the predetermined communication device when a limitation is placed on the specified function.

According to the present invention, it is possible to place an effective function limitation without impairing the flexibility in use of the mobile communication device.

BRIEF DESCRIPTION OF THE DRAWINGS

FIG. 6 shows a series of screens sequentially displayed on the parent's mobile telephone terminal, according to Steps A9, A12 and A20 in FIG. 4.

FIG. 11 shows a series of screens sequentially displayed on the child's mobile telephone terminal, according to Steps D1 and D9 in FIG. 9.

FIG. 12 is a flowchart showing a second example of the parental control method according to the present example of the present invention.

DETAILED DESCRIPTION OF THE PREFERRED EMBODIMENTS

Hereinafter, a system in which the present invention is applied to parental control will be described in detail by illustrating a mobile telephone terminal as an example of a mobile communication terminal. However, the present invention is not limited to mobile telephone terminals but can be applied to any information processing devices and communication terminals in general that function as a mobile station in a mobile communications system.

1. Mobile Communications System

Figure 1:
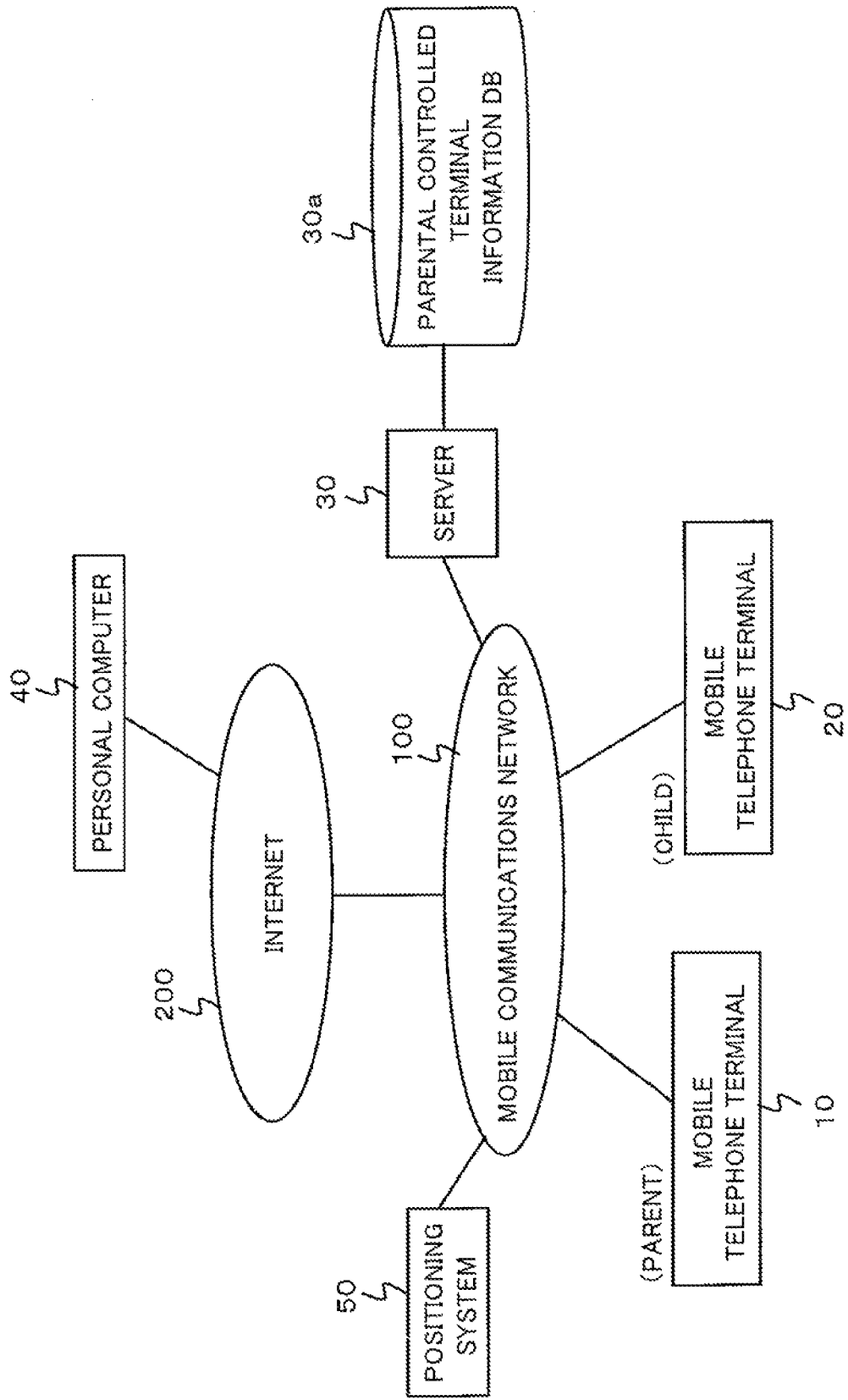
FIG. 1 is a network diagram showing a schematic structure of a mobile communications system according to an exemplary embodiment of the present invention.

Referring to FIG. 1, in a mobile communications system according to an exemplary embodiment of the present invention, it is assumed that a parent and his/her child carry a mobile telephone terminal (first mobile communication terminal) 10 and a mobile telephone terminal (second mobile communication terminal) 20, respectively, which can communicate with a server 30, a personal computer 40, and a positioning system 50 through a network. The server 30 is assumed to have a parental controlled terminal information database (DB) 30a, which will be described later. Here, the parent's mobile telephone terminal 10, child's mobile telephone terminal 20, server 30, and positioning system 50 are operated by program control and mutually connected through a mobile communication network 100. Moreover, it is assumed that the personal computer 40 is operated by program control and connected to the mobile communication network 100 through the Internet 200.

1.1) Mobile Telephone Terminal

Figure 2:
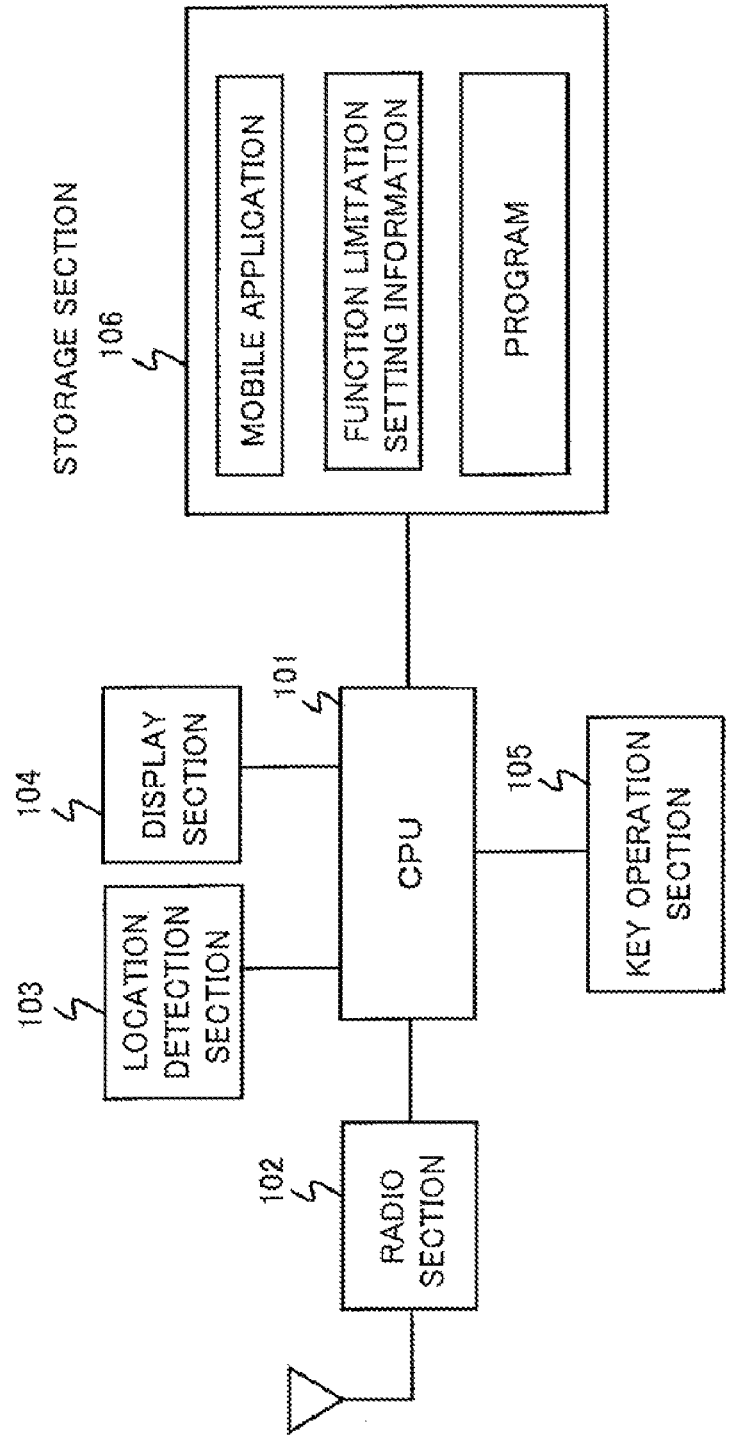
FIG. 2 is a block diagram showing a schematic configuration of a mobile telephone terminal according to the exemplary embodiment of the present invention.

The mobile telephone terminals 10 and 20 according to the present exemplary embodiment have basically the same configurations as shown in FIG. 2 but have different applications for parental control, which are downloaded from the server 30. Each of the mobile telephone terminals 10 and 20 includes: a central processing unit (CPU) 101 that is a program-controlled processor for controlling the overall operation of the terminal; a radio section 102 for performing radio communication with a base station in the mobile communication network 100; a location detection section 103 that detects, for example, GPS reception information; a display section 104 that displays necessary information; a key operation section 105 for allowing a user to enter instructions or data; a storage section 106 that stores downloaded applications (mobile applications), under-mentioned function limitation setting information, programs to be executed by the CPU 101, data, and the like; and others such as a speaker and a microphone (not shown) for conversation. The location detection section 103 notifies the positioning system 50 of, for example, GPS reception information and identification information on a currently connected base station. The CPU 101 can perform parental control by using a mobile application stored in the storage section 106. In addition, the CPU 101 has a clock means (not shown) indicating the current date and time and a schedule means (not shown). The CPU 101 performing the parental control is capable of time-based function limitation setting, which will be described later.

In the case of the parent's mobile telephone terminal 10, an application for parental control is downloaded as a mobile application in the storage section 106, and the mobile telephone terminal 10 is operated as follows by executing this mobile application. Specifically, the parent's mobile telephone terminal 10 can access a parental control service provided by the server 30 and can make an instruction to place or lift a limitation on a function or functions of the child's mobile telephone terminal 20. Additionally, the parent's mobile telephone terminal 10 has a function of receiving function limitation setting information on the child's mobile telephone terminal 20 from the server 30, as well as a function of downloading the application for parental control provided by the server 30.

In the case of the child's mobile telephone terminal 20, an application for parental control is downloaded as a mobile application in the storage section 106, and the mobile telephone terminal 20 is operated as follows by executing this mobile application. The child's mobile telephone terminal 20 is capable of setting a limitation or clearing a set limitation on its own function in accordance with an instruction from the server 30. In addition, the child's mobile telephone terminal 20 has a function of notifying the server 30, in response to a request to acquire logs, of WEB access destinations, call destinations (telephone number or address of the other party on a telephone connection), or the usage of its own terminal's functions, as well as a function of downloading the application for parental control provided by the server 30.

1.2) Server

Figure 3:
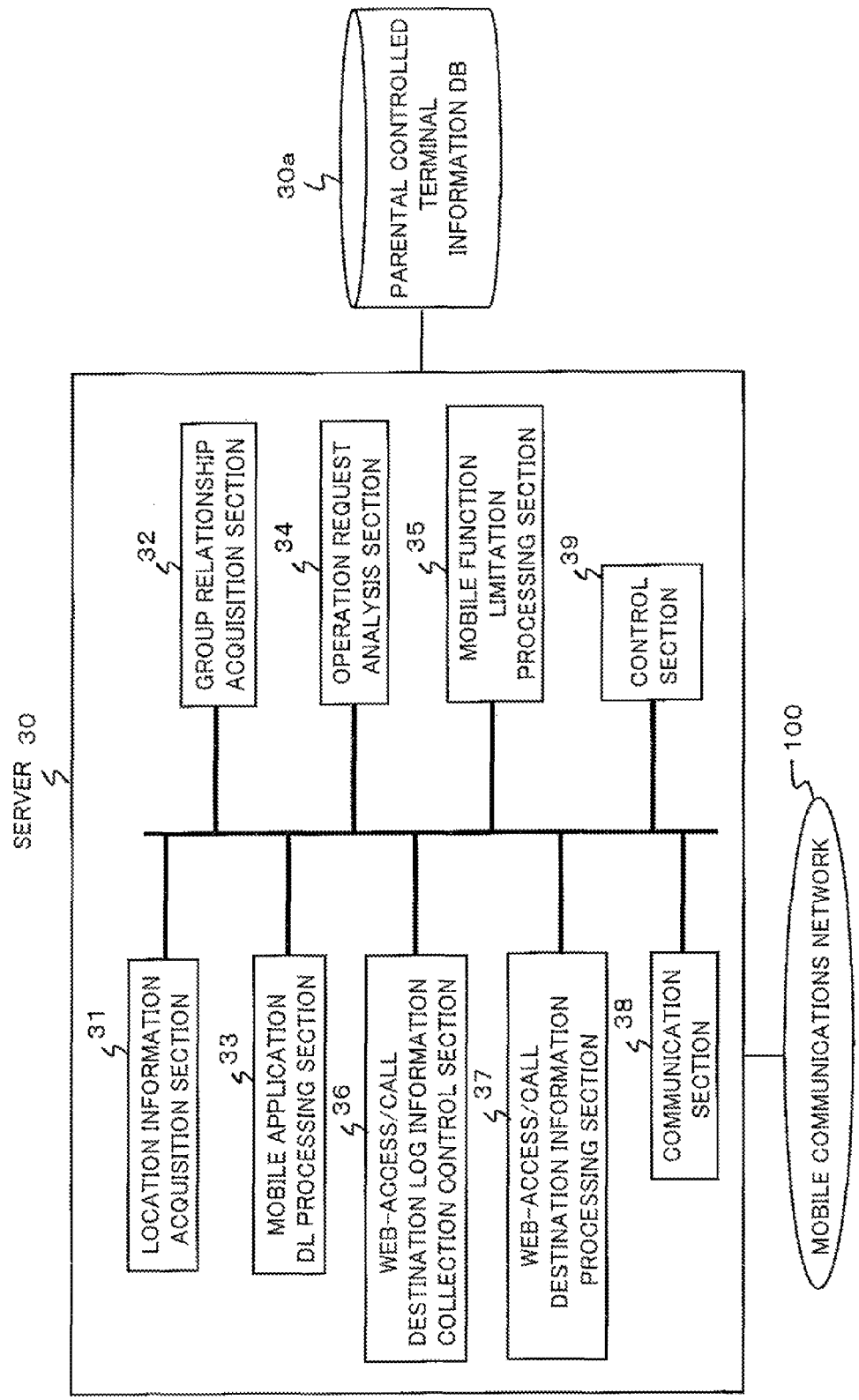
FIG. 3 is a schematic block diagram showing a functional configuration of a server used in the mobile communications system according to the exemplary embodiment of the present invention.

The server 30 is an information processing device such as a workstation server installed on a premise of a parental control service provider and has a functional configuration as shown in FIG. 3.

Referring to FIG. 3, a location information acquisition section 31 acquires location information on the parent's mobile telephone terminal 10 and child's mobile telephone terminal 20 from the positioning system 50. A group relationship acquisition section 32 acquires the group relationship between the parent's mobile telephone terminal 10 and child's mobile telephone terminal 20 from the parental controlled terminal information DB 30a. A mobile application download processing section 33 provides the parent's mobile telephone terminal 10 and child's mobile telephone terminal 20 through download with mobile applications for allowing them to use a parental control function. An operation request analysis section 34 analyzes an instruction to place or lift a limitation on a function of the child's mobile telephone terminal 20, upon receiving the instruction from the parent's mobile telephone terminal 10 or personal computer 40. A mobile function limitation processing section 35 sends an instruction to place or lift a limitation on a function to the child's mobile telephone terminal 20 in accordance with an instruction analyzed by the operation request analysis section 34.

A WEB-access/call destination log information collection control section 36 collects WEB access destinations, call destinations, and the usage of the mobile telephone terminal-side functions. Specifically, in response to a request for an advice on limitation setting from the parent's mobile telephone terminal 10 or personal computer 40, the WEB-access/call destination log information collection control section 36 collects information on sites WEB-accessed by the child's mobile telephone terminal 20, the telephone numbers of call destinations, and a history or logs of functions used by the child's mobile telephone terminal 20 and returns the collected information.

A WEB-access/call destination information processing section 37 checks a WEB site which has been frequently accessed, a call destination to which calls have been frequently made, and a function on the mobile telephone terminal side which has been frequently used, and then sends them as an advice on a target to be limited to the mobile telephone terminal or personal computer originating the request. Specifically, the WEB access destination/call destination information processing section 37 acquires from the WEB access destination/call destination log information collection control section 36 information on a site which has been frequently WEB-accessed, a telephone number to which calls have been frequently made, and a function of the child's mobile telephone terminal 20 which has been frequently used and provides these pieces of information to the parent's mobile telephone terminal 10 or personal computer 40 that has sent the request for an advice on limitation setting.

A communication section 38 of the server 30 is connected to the mobile communication network 100 and makes undermentioned various kinds of communications possible. A control section 39 is a program-controlled processor such as a CPU, which executes programs stored in a memory (not shown) to control various operations other than the operation as a server, such as under-mentioned password authentication performed with a mobile telephone terminal and selection and designation of an item to be limited among various options. It is also possible to implement the same functions as the above-described functional blocks denoted by the reference numerals 31 to 37, by.

Note that the parental controlled terminal information DB 30*a* manages the telephone number of the parent's mobile telephone terminal 10 and the telephone number of the child's mobile telephone terminal 20 grouped with the parent's mobile telephone terminal 10.

1.3) Others

The personal computer 40 is an information processing device and has a function of accessing a parental control service provided by the server 30 and making an instruction to place or lift a limitation on a function of the mobile telephone terminal 20. Moreover, the personal computer 40 has a function of receiving the function limitation setting information on the mobile telephone terminal 20 from the server 30.

The positioning system 50 is comprised of an information processing device, such as a workstation server installed on a premise of the parental control service provider, and other equipment such as a GPS antenna. The positioning system 50 has a function of calculating location information on a target mobile telephone terminal or location information on a designated area, in response to a request for positioning or a request for location information from the location information acquisition section 31 of the server 30, and returning the calculated location information to the server 30. Note that the positioning system 50 can calculate the location of a mobile telephone terminal by using GPS reception information and information on a currently connected base station received from the mobile telephone terminal.

2. Operation

Hereinafter, function limitation control operation performed in the mobile communications system or at the mobile telephone terminals according to an example of the present invention will be described in detail with reference to FIGS. 4 to 11.

2.1) Function Limitation Setting

First, a description will be given of an operation performed when a parent (or a guardian) places a function limitation on a child's mobile telephone terminal, with reference to FIGS. 4 to 6.

Figure 4:
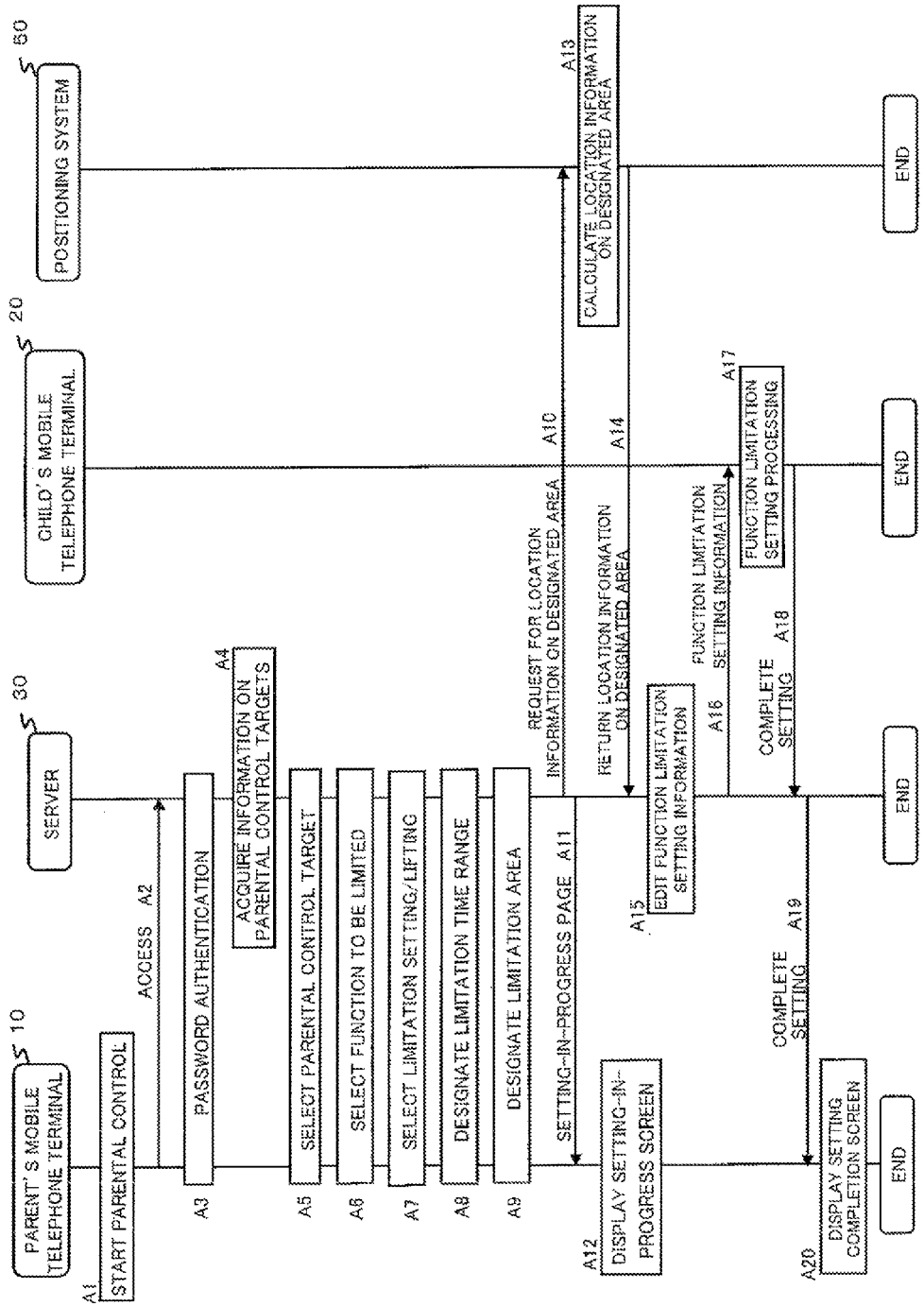
FIG. 4 is a sequence diagram showing a function limitation setting procedure performed on a child's mobile telephone terminal from a parent's mobile telephone terminal in a mobile communications system according to an example of the present invention.
Figure 5:
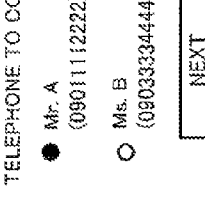
FIG. 5 shows a series of screens sequentially displayed on the parent's mobile telephone terminal, according to Steps A3 to A8 in FIG. 4.

Referring to FIG. 4, the parent starts the application for parental control by using the parent's mobile telephone terminal 10 (Step A1). In accordance with the application for parental control, the CPU 101 accesses the server 30 by using the radio section 102 (Step A2) and first performs password authentication (Step A3).

Specifically, the server 30, invoked by the access from the parent's mobile telephone terminal 10, sends electronic data for a password entry page display to the parent's mobile telephone terminal 10. The parent's mobile telephone terminal 10 receives the electronic data for a password entry page display from the server 30 and displays a screen to enter a password (see (A) of FIG. 5). After the screen to enter a password is displayed, the parent clicks a password entry field and enters a password (see (B) of FIG. 5), whereby the password is sent to the server 30 as electronic data. The server 30 receives the electronic data of the password from the parent's mobile telephone terminal 10, thus performing password authentication.

When the password is authenticated for the parent's mobile telephone terminal 10, the server 30 acquires the names and telephone numbers of parental control targets from the parental controlled terminal information DB 30*a* (Step A4) and executes a parental control target selection procedure (Step A5). Specifically, the server 30 edits the acquired names and telephone numbers of the parental control targets and sends electronic data for a parental control target selection page to the parent's mobile telephone terminal 10. The parent's mobile telephone terminal 10, upon receiving the electronic data for a parental control target selection display from the server 30, displays a screen to select a parental control target (see (C) of FIG. 5). When the screen to select a parental control target is displayed, the parent selects the telephone number of the child's mobile telephone terminal 20 on which the parent is to place a limitation, whereby an instruction to select the parental control target is sent to the server 30 as electronic data.

The server 30, upon receiving the electronic data of an instruction to select the parental control target from the parent's mobile telephone terminal 10, subsequently sends electronic data for a function-to-be-controlled (function-to-be-limited; hereinafter, referred to as "limited-function") selection page to the parent's mobile telephone terminal 10 and executes a limited-function selection procedure (Step A6). Specifically, upon receiving the electronic data for a limited-function selection display from the server 30, the parent's mobile telephone terminal 10 displays a screen to select a function to be limited (see (D) of FIG. 5). The parent selects a function to be limited, whereby the parent's mobile telephone terminal 10 sends an instruction to select the function to be limited to the server 30 as electronic data. The server 30, upon receiving the electronic data of an instruction to select the function to be limited from the parent's mobile telephone terminal 10, edits the function to be limited into function limitation setting information.

Subsequently, the server 30 sends electronic data for a function limitation setting/lifting selection page to the parent's mobile telephone terminal 10, thereby executing a function limitation setting/lifting selection procedure (Step A7). Specifically, the parent's mobile telephone terminal 10, upon receiving the electronic data for a function limitation setting/lifting selection page from the server 30, displays a screen to select function limitation setting/lifting (see (E) of FIG. 5). When the screen to select function limitation setting/lifting is displayed, the parent selects either to set on a function limitation or to cancel a set limitation, whereby an instruction to select the function limitation setting/lifting is sent to the server 30 as electronic data. The server 30, upon receiving the electronic data of an instruction to select the function limitation setting/lifting from the parent's mobile telephone terminal 10, edits the designated option into function limitation setting information. Note that it is also possible to make a configuration such that the setting of a function limitation is automatically canceled when the parent accompanies the child, which will be described later.

Subsequently, the server 30 sends electronic data for a function limitation time range designation page to the parent's mobile telephone terminal 10, thereby executing a limitation time range designation procedure (Step A8). Specifically, the parent's mobile telephone terminal 10, upon receiving the electronic data for a function limitation time range designation page from the server 30, displays a screen to designate a function limitation time range (see (F) of FIG. 5). When the screen to designate a function limitation time range is displayed, the parent designates time information such as a day and a time period during which the function limitation is set on, whereby the time information such as a day and a time period during which the function limitation is set on is sent to the server 30 as electronic data. The server 30, upon receiving the electronic data of the function limitation time information from the parent's mobile telephone terminal 10, edits the day and time period during which the function limitation is set on into function limitation setting information.

Subsequently, the server 30 sends electronic data for a function limitation area designation page to the parent's mobile telephone terminal 10, whereby executing a limitation area designation procedure (Step A9). Specifically, the parent's mobile telephone terminal 10, upon receiving the electronic data for a function limitation area designation page from the server 30, displays a screen to designate a function limitation area where the function is limited (see (G) of FIG. 6). When the screen to designate a function limitation area is displayed, the parent designates a function limitation area, whereby the designation of the function limitation area is sent to the server 30 as electronic data. Upon receiving the electronic data of the designation of the function limitation area from the parent's mobile telephone terminal 10, the server 30 sends electronic data of a request for location information on the designated area to the positioning system 50 (Step A10). After sending the electronic data of the request for location information on the designated area to the positioning system 50, the server 30 sends electronic data for a function limitation-setting-in-progress page to the parent's mobile telephone terminal 10 (Step A11). The parent's mobile telephone terminal 10, upon receiving the electronic data for a function limitation-setting-in-progress page from the server 30, displays a screen indicating "function limitation setting in progress" (Step A12, see (H) of FIG. 6). The positioning system 50, upon receiving the electronic data of the request for location information on the designated area from the server 30, calculates the location information on the designated area (Step A13) and sends electronic data of the calculated location information on the designated area to the server 30 (Step A14). The server 30, upon receiving the electronic data of the location information on the designated area from the positioning system 50, edits the location information on the function limitation area into function limitation setting information.

The server 30 edits the function limitation setting information thus generated through Steps A6 to A9 (Step A15) and sends electronic data of the function limitation setting information to the child's mobile telephone terminal 20 (Step A16).

At the child's mobile telephone terminal 20, upon receiving the electronic data of the function limitation setting information from the server 30, the CPU 101 executing the application for parental control stores the received function limitation setting information in the storage section 106 and completes the processing of function limitation setting (Step A17). Upon completing the processing of function limitation setting, the child's mobile telephone terminal 20 sends electronic data indicating the completion of the processing of function limitation setting to the server 30 (Step A18).

The server 30, upon receiving the electronic data indicating the completion of the processing of function limitation setting from the child's mobile telephone terminal 20, sends electronic data for a function limitation setting completion page to the parent's mobile telephone terminal 10 (Step A19).

The parent's mobile telephone terminal 10, upon receiving the electronic data for a function limitation setting completion page from the server 30, displays a screen indicating the completion of function limitation setting (Step A20, see (I) of FIG. 6, whereby the parent knows that the setting of the designated function limitation on the child's mobile telephone terminal 20 is completed.

2.2) Notification of Usage

Next, a description will be given of an operation performed when the usage of the child's mobile telephone terminal is notified to the parent, with reference to FIGS. 7 and 8.

Figure 7:
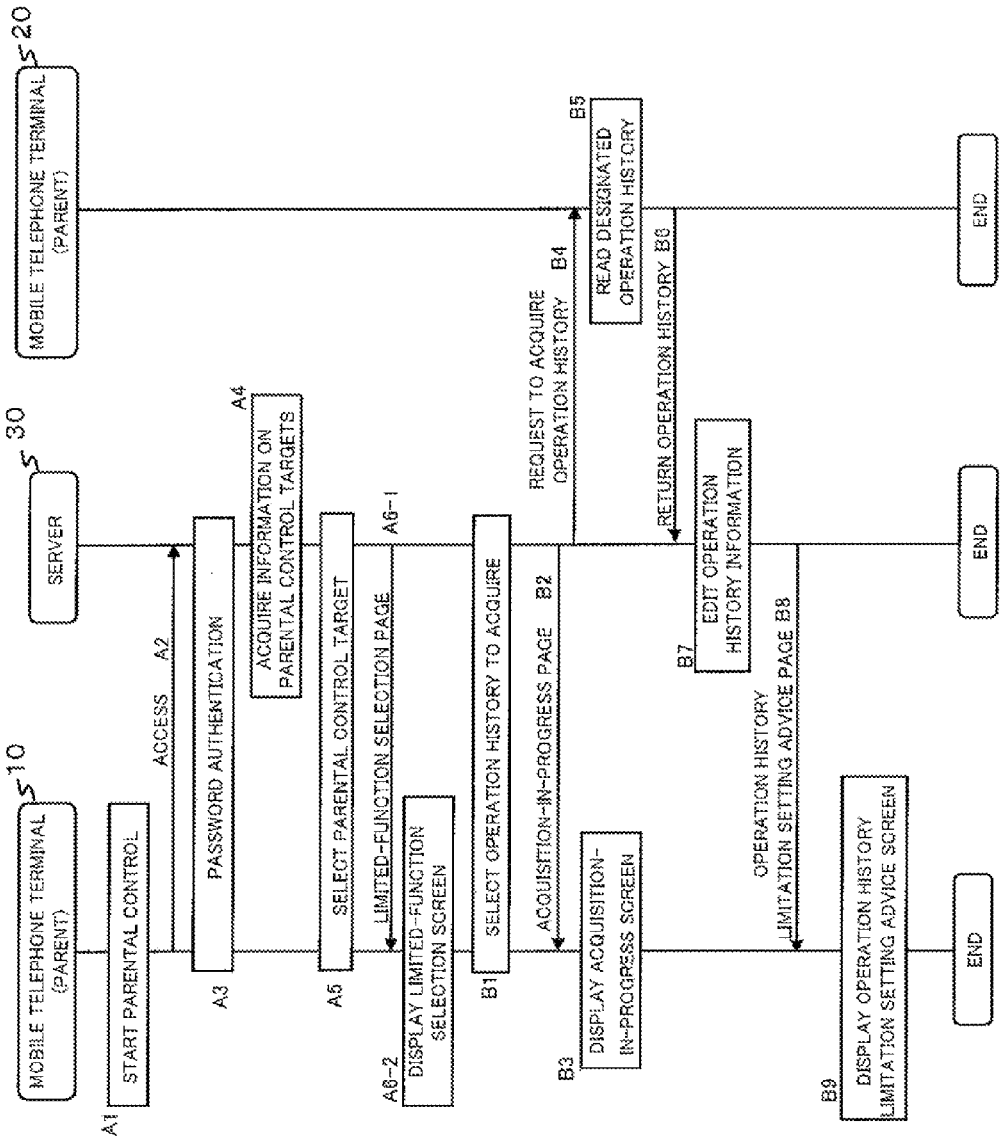
FIG. 7 is a sequence diagram showing a procedure in which the parent's mobile telephone terminal collects an operation history from the child's mobile telephone terminal in the mobile communications system according to the present example of the present invention.

Steps A1 to A5 in FIG. 7 are similar to those in FIG. 4 and therefore are denoted by the same reference symbols and numerals as in FIG. 4, and a description thereof will be omitted. When the server 30 receives the electronic data of an instruction to select the parental control target from the parent's mobile telephone terminal 10 in Step A5, the server 30 returns electronic data for a function-to-be-controlled (limited-function) selection page to the parent's mobile telephone terminal 10 (Step A6-1), and a screen to select a function to be limited is displayed on the parent's mobile telephone terminal 10 (Step A6-2). After the screen to select a function to be limited is displayed, the parent selects to collect operation histories, whereby an operation history selection procedure is executed (Step B1, see (A) of FIG. 8).

Specifically, by the parent selecting to collect operation histories, an instruction to collect operation histories is sent as electronic data from the parent's mobile telephone terminal 10 to the server 30. The server 30, upon receiving the electronic data of an instruction to collect operation histories from the parent's mobile telephone terminal 10, sends electronic data for an operation history selection page to the parent's mobile telephone terminal 10. The parent's mobile telephone terminal 10 receives the electronic data for an operation history selection display from the server 30 and displays a screen to select an operation history (see (B) of FIG. 8). After the screen to select an operation history is displayed, the parent selects an operation history to acquire, whereby the designation of the operation history is sent as electronic data to the server 30.

The server 30, upon receiving the electronic data of the designation of the operation history from the parent's mobile telephone terminal 10, sends electronic data for an operation-history-acquisition-in-progress page to the parent's mobile telephone terminal 10 (Step B2). The parent's mobile telephone terminal 10, upon receiving the electronic data for an operation-history-acquisition-in-progress page from the server 30, displays a screen indicating "operation history acquisition in progress" (Step B3, see (C) of FIG. 8).

After sending the electronic data for an operation-history-acquisition-in-progress page to the parent's mobile telephone terminal 10, the server 30 sends electronic data of a request to acquire the operation history to the child's mobile telephone terminal 20 (Step B4). The child's mobile telephone terminal 20, upon receiving the electronic data of the request to acquire the operation history from the server 30, reads the designated operation history from among operation histories stored in the child's mobile telephone terminal 20 (Step B5) and returns the read operation history to the server 30 (Step B6).

The server 30, upon receiving the operation history from the child's mobile telephone terminal 20, edits the received operation history into information to be displayed on an operation history limit setting advice page (Step B7) and sends electronic data for the operation history limit setting advice page to the parent's mobile telephone terminal 10 (Step B8).

Figure 8:
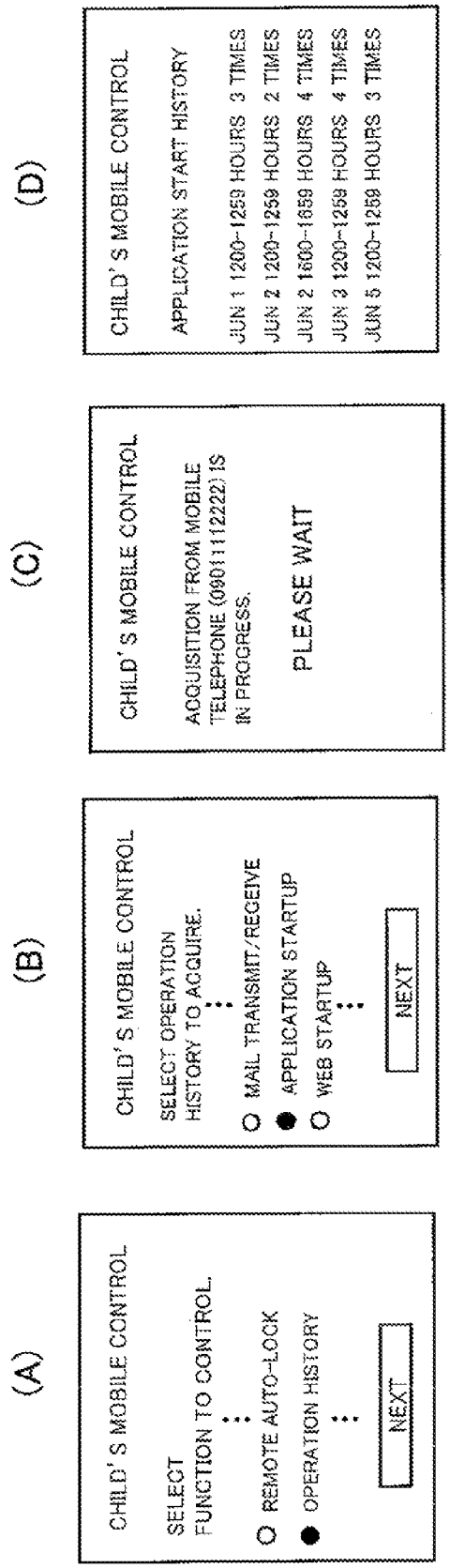
FIG. 8 shows a series of screens sequentially displayed on the parent's mobile telephone terminal, according to Steps A6, B1, B4 and B9 in FIG. 7.

The parent's mobile telephone terminal 10, upon receiving the electronic data for the operation history limit setting advice display from the server 30, displays a screen showing the operation history limit setting advice (Step B9, see (D) of FIG. 8).

2.3) Function Limitation Control

Figure 9:
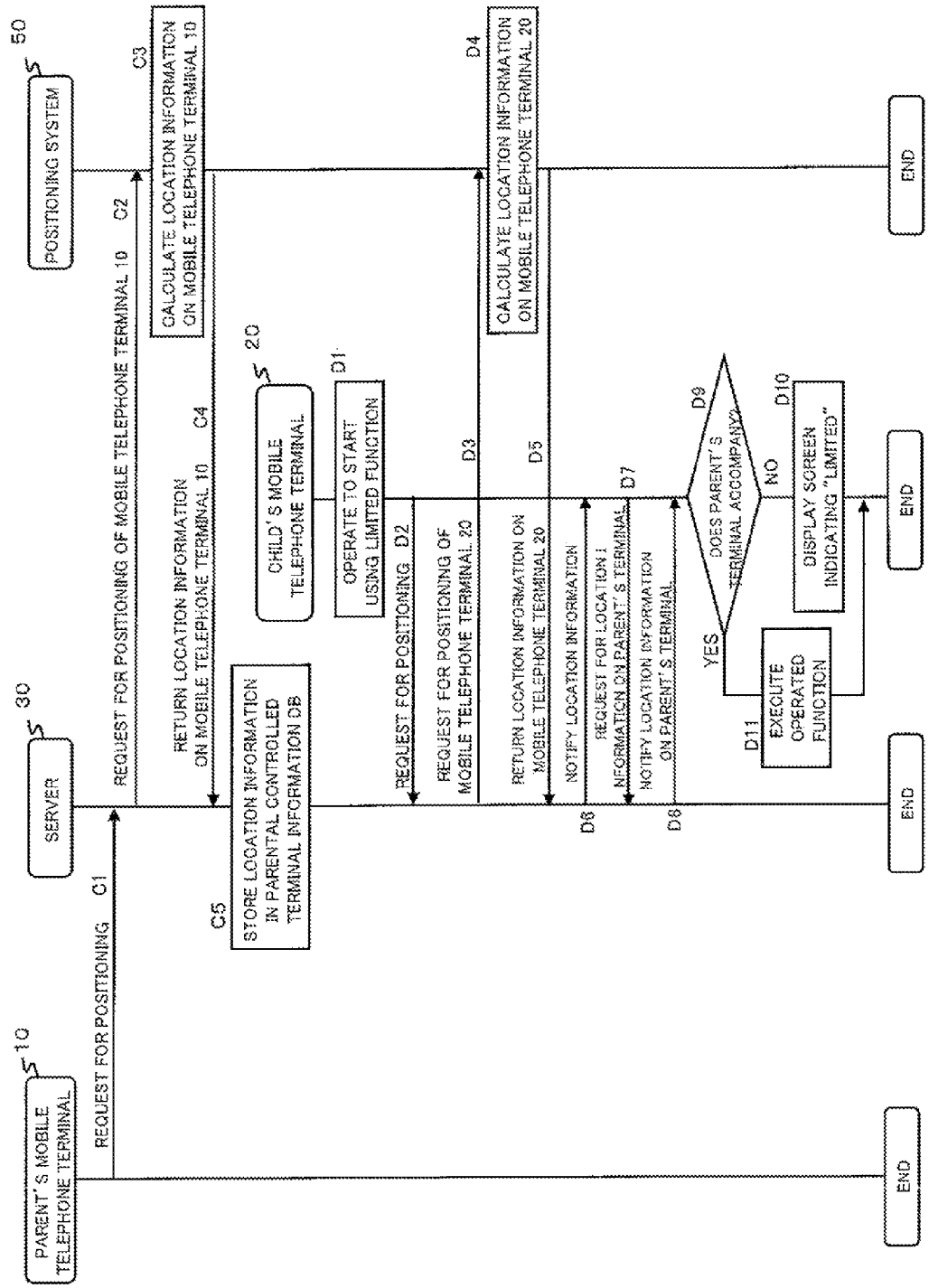
FIG. 9 is a sequence diagram showing parental control on the child's mobile telephone terminal utilizing location information in the mobile communications system according to the present example of the present invention.

Referring to FIG. 9, first, the parent's mobile telephone terminal 10 sends electronic data of a request for positioning of its own terminal to the server 30 (Step C1), The server 30, upon receiving the electronic data of the request for positioning from the parent's mobile telephone terminal 10, sends electronic data of the request for positioning of the parent's mobile telephone terminal 10 to the positioning system 50 (Step C2). The positioning system 50, upon receiving the electronic data of the request for positioning of the parent's mobile telephone terminal 10 from the server 30, calculates location information on the parent's mobile telephone terminal 10 (Step C3) and returns the calculated location information to the server 30 (Step C4). The server 30, upon receiving the location information on the parent's mobile telephone terminal 10 from the positioning system 50, stores the received information as location information on the parent's mobile telephone terminal 10 in the parental controlled terminal information DB 30a (Step C5). It is preferable that such registration of location information on the parent's mobile telephone terminal 10 be performed periodically. However, it is also possible that a request for positioning of the parent's mobile telephone terminal 10 is sent to the positioning system 50 at request of the child's mobile telephone terminal 20.

Next, a description will be given of a case where the child uses a limited-function of the mobile telephone terminal 20. It is assumed that limitation conditions are set beforehand through the parent's mobile telephone terminal 10. The limitation conditions that can be set include a type of function, a time range of use, an area, and the like, which will be described later.

First, it is assumed that the child operates the key operation section 105 to use a limited-function of the mobile telephone terminal 20 (Step D1). Thereby, the mobile telephone terminal 20 sends a request for positioning of its own terminal to the server 30 (Step D2), and the server 30 sends a demand for positioning of the mobile telephone terminal 20 to the positioning system 50 (Step D3). The positioning system 50, upon receiving the demand for positioning of the mobile telephone terminal 20 from the server 30, calculates location information on the mobile telephone terminal 20 (Step D4) and returns the calculated location information to the server 30 (Step D5). The server 30 returns the location information on the mobile telephone terminal 20 received from the positioning system 50 to the mobile telephone terminal 20 (Step D6).

The mobile telephone terminal 20, upon receiving the location information on its own terminal, subsequently requests location information on the parent's mobile telephone terminal 10 from the server 30 (Step D7). In response to this request, the server 30 retrieves the location information on the parent's mobile telephone terminal 10 from the parental controlled terminal information DB 30a and returns the retrieved location information to the child's mobile telephone terminal 20 (Step D8). It is also possible that in response to the request sent in Step D7, the server 30 sends a request for positioning as described in Step C2 and receives the location information as described above.

At the child's mobile telephone terminal 20, upon acquiring the location information on its own terminal and the location information on the parent's mobile telephone terminal 10, the CPU 101 determines whether or not its own terminal is located near the parent's mobile telephone terminal 10, in other words, whether or not the parent accompanies the child (Step D9). For example, the determination can be made based on whether or not they are within a predetermined distance of each other, whether or not their locations are detected as identical locations, whether or not they are in the cell/sector of the same base station, or the like.

When it is determined that the parent does not accompany (Step D9: NO), the operated function is not started, and only a screen indicating "limited" is displayed (Step D10). When it is determined that the parent accompanies (Step D9: YES), the CPU 101 enables and executes the limited function the child starts using (Step D11).

In this manner, even when a limitation is being placed on a function of the child's mobile telephone terminal 20, the limitation on the limited function is lifted as long as the parent accompanies the child, whereby it is possible to avoid a situation where the flexibility for the child to use the mobile telephone is impaired. Note that an accompanying person is not necessarily a parent but may be a specific user (guardian) registered in the same group beforehand.

3. First Example

Next, a description will be given of a specific example of the function limitation control on a mobile telephone terminal on which a function limitation is placed like the above-described child's mobile telephone terminal 20, with reference to FIG. 10. Here, it is assumed that the function limitation setting (Steps A6 to A9) shown in FIG. 4 has been performed and the function limitation setting information is stored in the storage section 106 of the mobile telephone terminal.

It is assumed that the key operation section 105 of the mobile telephone terminal is operated and the use of a certain function (for example, a call function) is started (Step 201, see (A) of FIG. 11). The CPU 101 executing the mobile application, upon detecting the key operation, determines whether or not the function tried to be used is a limited-function as set in Step A6 in FIG. 4 (Step 202).

When the function in question is the limited function (Step 202: YES), the CPU 101 determines whether or not the current time is within a function limitation time range as set in Step A8 in FIG. 4 (Step 203).

If the function in question is tried to be used in the function limitation time range (Step 203: YES), the CPU 101 detects the current location of its own terminal from the location detection section 103 (Step 204) and determines whether or not the current location is within a limitation area as set in Step A9 in FIG. 4 (Step 205).

If the current location is within the limit area (Step 205: YES), the CPU 101 acquires the current location of a specific terminal registered in the same group from the server 30 (Step 206) and compares the current location of its own terminal with the current location of the specific terminal, thereby determining whether or not the two terminals are within a predetermined space range (Step 207). Here, the predetermined space range can be any short distance as long as it can be said that the two terminals accompany each other, including a case, for example, where the locations of the two terminals are determined to be identical through GPS positioning. Note that the current location of the specific terminal can also be acquired by receiving GPS information measured by this specific terminal.

When it is determined that the specific terminal does not accompany (Step 207: NO), a screen indicating "limited" is displayed on the display section 104, and the function in question is disabled (Step 208, see (B) of FIG. 11).

On the other hand, when it is determined that the specific terminal accompanies (Step 207: YES), the CPU 101 executes the function in question (Step 209). That is, according to the present example, a setting is made such that even a function on which a limitation is being placed can be used by a child straightaway when the child is accompanied by a parent.

Note that in this example, the function in question can also be executed (Step 209) when the function is not the limited function (Step 202: NO), when the current time is not within the function limitation time range (Step 203: NO), or when the mobile telephone terminal is out of the limit area (Step 205: NO).

4. Second Example

Figure 10:
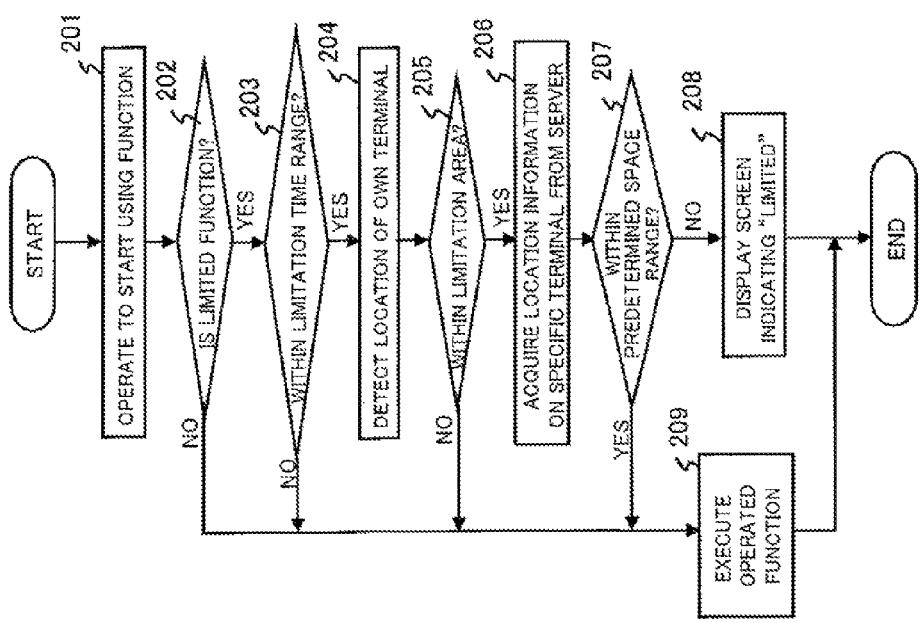
FIG. 10 is a flowchart showing a first example of a parental control method according to the present example of the present invention.

Referring to FIG. 12, it is also possible to make a configuration such that a limited-function can be executed even during a limitation time range if a mobile telephone terminal is accompanied by a specific terminal, by eliminating Step 205 for the determination as to the limit area from the above-described flowchart of FIG. 10. Note that the same steps in FIGS. 10 and 12 are denoted by the same reference symbols and numerals, and a description thereof will be omitted.

5. Effects

As described above, by combining an operation performed by the parent's mobile telephone terminal 10 and location information and/or time information on the child's mobile telephone terminal 20, a setting is possible that enables or disables a function of the child's mobile telephone at any time and anywhere. In particular, it is also possible to make a setting (as well as to cancel a setting) that enables a function of the child's mobile telephone terminal depending on the location relationship of the child's mobile telephone terminal with the parent's mobile telephone terminal (depending on whether or not the child is accompanied by the parent). That is, it is possible to place or lift a limitation on a function of the child's mobile telephone terminal as long as the parent can recognize that the child enters a designated area during a designated time period on a designated day.

Moreover, the system notifies a site frequently accessed by the child and a destination of frequent calls made by the child to the parent's mobile telephone terminal as an access history. Therefore, it is easy for the parent to determine the necessity to place a WEB access limitation and/or a call limitation on the child's mobile telephone terminal. In this manner, the parent (or guardian) can grasp the functions used by the child by instructing to collect the usage of the child's mobile telephone terminal, and such information can be provided as information for the parent to place or lift a limitation on the use of a function of the child's mobile telephone terminal.

The present invention can be applied to systems in which limit control is performed on the use of a function of a mobile communication terminal.

The present invention may be embodied in other specific forms without departing from the spirit or essential characteristics thereof. The above-described exemplary embodiment and examples are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A mobile communication device having a plurality of functions, comprising:
    a function limitation setting section for setting a limitation on a specified function according to function limitation setting information which is determined by a predetermined communication device through a server; and
    a control section for determining whether to enable the specified function depending on a relationship of location with the predetermined communication device when the function limitation setting section places a limitation on the specified function,
    wherein the function limitation setting information sets a time range and a geographic area in which the specified function is unusable by the mobile communication device unless the mobile communication device is located within a predetermined distance away from the predetermined communication device,
    such that where a current time falls within the time range, the mobile communication device is within the geographic area, and the mobile communication device is located away from the predetermined communication device more than the predetermined distance, the specification function is not usable by the mobile communication device, and
    such that where the current time falls within the time range, the mobile communication device is within the geographic area, and the mobile communication device is located away from the predetermined communication device less than the predetermined distance, the specification function is usable by the mobile communication device.

2. The mobile communication device according to claim 1, wherein the control section enables the specified function when the predetermined communication device is located within a predetermined distance from the mobile communication device.

3. The mobile communication device according to claim 1, wherein, when an operation to use the specified function is made, the control section acquires location information of the predetermined communication device from the server to determine the relationship of location with the predetermined communication device.

4. A method for controlling function limitation in a mobile communication device having a plurality of functions, comprising:
    setting a limitation on a specified function according to function limitation setting information which is determined by a predetermined communication device through a server; and
    when a limitation is placed on the specified function, determining whether to enable the specified function depending on a relationship of location with the predetermined communication device,
    wherein the function limitation setting information sets a time range and a geographic area in which the specified function is unusable by the mobile communication device unless the mobile communication device is located within a predetermined distance away from the predetermined communication device,
    such that where a current time falls within the time range, the mobile communication device is within the geographic area and the mobile communication device is located away from the predetermined communication device more than the predetermined distance, the specification function is not usable by the mobile communication device, and such that where the current time falls within the time range, the mobile communication device is within the geographic area, and the mobile communication device is located away from the predetermined communication device less than the predetermined distance, the specification function is usable by the mobile communication device.

5. The method according to claim 4, wherein the specified function is enabled when the predetermined communication device is located within a predetermined distance from the mobile communication device.

6. The method according to claim 4, wherein, when an operation to use the specified function is made, location information of the predetermined communication device is acquired from the server to determine the relationship of location with the predetermined communication device.

7. A mobile communications system comprising:
a mobile communication device having a plurality of functions;
a predetermined communication device which is capable of parental control of the mobile communication device; and
a server which provides a parental control service to the mobile communication device and the predetermined communication device,
wherein the predetermined communication device determines function limitation setting information through the server to set a limitation on a specified function of the mobile communication device,
wherein the mobile communication device determines whether to enable the specified function depending on a relationship of location with the predetermined communication device when a limitation is placed on the specified function,
wherein the function limitation setting information sets a time range and a geographic area in which the specified function is unusable by the mobile communication device unless the mobile communication device is located within a predetermined distance away from the predetermined communication device,
such that where a current time falls within the time range, the mobile communication device is within the geographic area, and the mobile communication device is located away from the predetermined communication device more than the predetermined distance, the specification function is not usable by the mobile communication device, and
such that where the current time falls within the time range, the mobile communication device is within the geographic area, and the mobile communication device is located away from the predetermined communication device less than the predetermined distance, the specification function is usable by the mobile communication device.

8. The mobile communications system according to claim 7, wherein the specified function is enabled when the predetermined communication device is located within a predetermined distance from the mobile communication device.

9. The mobile communications system according to claim 7, wherein, when an operation to use the specified function is made, the mobile communication device acquires location information of the predetermined communication device from the server to determine the relationship of location with the predetermined communication device.

10. A non-transitory recording medium storing a program for instructing a program-controlled processor to control function limitation in a mobile communication device having a plurality of functions, the program comprising:
setting a limitation on a specified function according to function limitation setting information which is determined by a predetermined communication device through a server; and
when a limitation is placed on the specified function, determining whether to enable the specified function depending on a relationship of location with the predetermined communication device,
wherein the function limitation setting information sets a time range and a geographic area in which the specified function is unusable by the mobile communication device unless the mobile communication device is located within a predetermined distance away from the predetermined communication device,
such that where a current time falls within the time range, the mobile communication device is within the geographic area, and the mobile communication device is located away from the predetermined communication device more than the predetermined distance, the specification function is not usable by the mobile communication device, and
such that where the current time falls within the time range, the mobile communication device is within the geographic area, and the mobile communication device is located away from the predetermined communication device less than the predetermined distance, the specification function is usable by the mobile communication device.

11. The non-transitory recording medium according to claim 10, wherein the specified function is enabled when the predetermined communication device is located within a predetermined distance from the mobile communication device.

12. The non-transitory recording medium according to claim 10, wherein, when an operation to use the specified function is made, location information of the predetermined communication device is acquired from the server to determine the relationship of location with the predetermined communication device.

* * * * *